United States Patent Office 3,809,651
Patented May 7, 1974

3,809,651
LUBRICATING OIL CONTAINING AN ALKYLMERCAPTOSUCCINIMIDE
Wheeler C. Crawford and Arthur W. Godfrey, Fishkill, and Robert E. Reid, Glenham, N.Y., assignors to Texaco Inc., New York, N.Y.
No Drawing. Filed Apr. 7, 1971, Ser. No. 132,198
Int. Cl. C10m 1/20, 1/32, 1/38
U.S. Cl. 252—47.5    12 Claims

ABSTRACT OF THE DISCLOSURE

Lubricating oil composition comprising a major proportion of a mineral lubricating oil and from about 0.005 to 5.0 weight percent of an N-alkylmercaptosuccinimide in which the alkyl radical has from about 12 to 22 carbon atoms and a method of operating an automatic transmission having friction sensitive power transmitting means on a composition comprising a mineral oil and the above-described N-alkylmercaptosuccinimide.

BACKGROUND OF THE INVENTION

Field of the invention

The demands for improved performance and extended life for lubricating oil compositions, hydraulic fluids and automatic transmission fluids spurs a constant search for new additives and lubricating oil formulations to achieve the desired goals. Particularly difficult is the provision of an improved lubricant for central hydraulic systems and automatic transmissions. An automatic transmission is a complex hydraulic mechanism having friction sensitive power transmitting means which incorporates the functions of a torque converter, wet clutches and planetary gearing in a relatively compact sealed unit. The lubricants for the automatic transmission must provide lubricity, extreme pressure and dispersant properties as well as satisfactory frictional properties. In addition, the fluid must not be corrosive to copper alloys or in any way deleterious to the synthetic seals in the transmission. The most important requirement is the maintenance of good lubricity and friction modifying properties under prolonged high-shear and high temperature conditions.

Carboxylic acids or their derivative have been widely employed as lubricity agents or friction modifiers in mineral oil based automatic transmission fluids to provide commercial hydraulic fluids having a useful service life. These lubricity agents, however, have stability limitations which materially limits their life. This is evidenced by a rising static coefficient of friction in the fluid and by the early onset of erratic or harsh shifting in service and in automatic transmission tests. Automobile manufacturers and lubricating oil formulators have been particularly interested in developing an automatic transmission fluid which provides a substantially extended friction stable life as measured by conventional ATF Cycling Tests.

SUMMARY OF THE INVENTION

The novel lubricating oil composition of the invention comprises a major proportion of a mineral lubricating oil and a minor friction modifying amount of an N-alkylmercaptosuccinimide in which the alkyl radical is a straight chain alkyl radical having from about 12 to 22 carbon atoms which is connected to the nitrogen atom at an alpha or beta carbon in said radical.

The novel method of the invention involves operating an automatic transmission or a friction sensitive power transmitting means by supplying to said mechanism the above-described lubricating oil composition.

SPECIFIC EMBODIMENTS OF THE INVENTION

In a more specific embodiment of the invention, the lubricating oil composition will comprise at least 86 weight percent of a mineral lubricating oil and from about 0.005 to 5.0 weight percent of an N-alkyl mercaptosuccinimide corresponding to the formula:

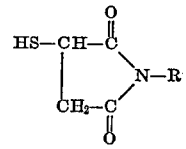

in which R is a straight chain alkyl radical having from 12 to 22 carbon atoms which is connected to the nitrogen atom through an alpha or beta carbon atom. In a still more specific embodiment, the lubricating oil composition will contain a dispersant, generally an ashless dispersant, such as the reaction product of a succinic compound and a polyalkylene polyamine, in an amount ranging from about 0.1 to 5.0 weight percent.

The N-alkylmercaptosuccinimide employed in the lubricating oil composition of the invention corresponds to the formula:

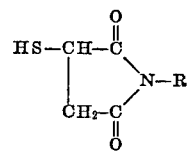

in which R is a straight chain alkyl radical having from 12 to 22 carbon atoms which is connected to the nitrogen atom through an alpha or beta carbon atom. Thus, R can be radical formulas:

(a)    $-CH_2-(CH_2)_n-CH_2-CH_3$ and (b)    $CH_3-\underset{|}{CH}-(CH_2)_n-CH_3$ where $n$ has a value from 9 to 19. The preferred N-alkylmercaptosuccinimides are those in which the alkyl radical contains from 14 to 20 carbon atoms corresponding to values for $n$ from 11 to 17. The alkyl radicals may be from natural sources as exemplified by the coco- and oleyl-radicals. It will be understood that the N-alkylmercaptosuccinimide is, in the presence of water, in an equilibrium mixture with the formula:

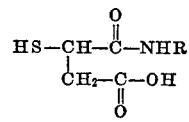

in which R has the same value noted above. Reference to N-alkylmercaptosuccinimide in the specification and claims covers this equilibrium form. The N-alkylmercaptosuccinimide is generally employed in a concentration ranging from about 0.005 to 5.0 weight percent with the preferred concentration being from 0.05 to 0.5 weight percent.

Examples of effective N-alkylmercaptosuccinimides include:

N-n-dodecylmercaptosuccinimide
N-n-tetradecylmercaptosuccinimide
N-n-hexadecylmercaptosuccinimide
N-n-octadecylmercaptosuccinimide
N-(n-$C_{14-20}$sec.alkyl)mercaptosuccinimide
N-beta-n-dodecylmercaptosuccinimide
N-beta-n-octadecylmercaptosuccinimide
N-(n-$C_{12}$sec.alkyl)mercaptosuccinimide The lubricating oil composition of the invention will generally be a fully formulated fluid containing minor amounts of conventional additives. For example, the oil composition can contain from about 0.5 to 8.0 weight percent of a polymer of mixed alkyl esters of methacrylic acid having above 25,000 molecular weight, 0.25 to 5.0 weight percent of a reaction product of a polyalkylene polyamine and an alkenyl succinic acid described above, 0.1 to 5 weight percent of a zinc dihydrocarbyl dithiophosphate and from about 0.1 to 2.5 weight percent of an arylsubstituted alpha naphthylamine.

The mineral oil base which constitutes at least 86 weight percent of the composition of the invention is a refined oil or a mixture of refined oils selected according to the viscosity requirements of the particular service. For automatic transmission service where the requirements include an SUS viscosity of the compounded oil at 210° F. of 49 minimum up to 60 and at 0° F. of 7,000 maximum (extrapolated), the base oil or the major component thereof is generally a distillate oil lighter than SAE-10 grade motor oil, such as one having an SUS viscosity at 100° F. less than 150 and generally between about 50 and 125. The distillate fraction can be a refined paraffinic distillate, a refined naphthenic distillate or a combination thereof. The flash point of the distillate component of the base oil will generally be substantially above 300° F.; if the distillate fraction constitutes the entire base oil, its flash point will usually be above 375° F.

A particularly preferred base oil comprises approximately 70 to 95 percent of a refined distillate oil and 5 to 30 percent of a refined residual fraction which imparts desired high flash point and lubricity to the base oil. A particularly preferred residual fraction comprises a paraffin base residuum which has been propane deasphalted and subjected to centrifuge dewaxing and which has an SUS at 210° F. below about 250. An effective base oil mixture comprises 68 percent of a furfural refined acid-treated, clay-contacted, solvent-dewaxed, paraffin base distillate having an SUS at 100° F. of 100, a viscosity index about 100, a flash above 385° F. and a pour below about +10° F., 22% of an acid-treated naphthenic base distillate having an SUS at 100° F. of 60, a flash above 300° F., and a pour below −40° F., and 10% of a paraffin base residuum which has been propane deasphalted, centrifuged-dewaxed, and clay-contacted, and has an SUS viscosity at 210° F. of about 160 a flash above 530° F. and a pour of +5° F.

A surprising feature of the mineral lubricating oil composition of the invention is that it exhibits an unusually long friction stable life as determined in the Dexron AT–12 Cycling Test. A relatively minor amount of the prescribed N-alkylmercaptosuccinimide generally in combination with an ashless dispersant in a suitable mineral lubricating oil is effective to provide an outstanding automatic transmission fluid. The preferred concentration of the N-alkylmercaptosuccinimide is from about 0.05 to 5.0 weight percent.

Viscosity index improvement of the lubricating oil composition of the invention is effected with a methacrylate ester polymer having the formula:

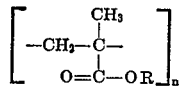

wherein R is an alkyl group, a dialkyl aminoalkyl group or a mixture of such groups containing from 1 to 20 carbon atoms and $n$ is a member providing a molecular weight of the polymer in the range from 25,000 to 1,250,000 and preferably from 35,000 to 200,000. Methacrylate ester polymers possessing pour depressant and viscosity index improving properties are well-known, see U.S. 2,737,496. A very effective material of this type is a copolymer of the lower $C_4$–$C_{14}$ alkyl methacrylate esters. A commercial methacrylate copolymer of this type which is primarily a viscosity index improver corresponds to the formula in which R represents about 32 percent lauryl, 28 percent butyl, 26 percent stearyl and 14 percent hexyl groups and having a molecular weight above 50,000. The methacrylate ester copolymer is employed in the base oil in an amount ranging from about 0.5 to 10 percent by weight, preferably from 1.0 to 5.0 percent, based upon the oil composition in order to impart the desired viscosity, viscosity index and pour point. It is understood that other conventional viscosity index improvers can be employed in the lubricant composition.

A dispersant, preferably an ashless dispersant, can be employed in the lubricating oil composition and is generally present in an automatic transmission fluid. An effective dispersant comprises the composition resulting from mixing a substituted succinic compound, selected from the class consisting of substittued succinic acids having the formula:

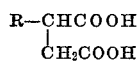

and substituted succinic anhydrides having the formula:

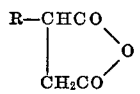

in which R is a large substantially aliphatic hydrocarbon radical having from about 50 to 200 carbon atoms with at least about one-half of a molar equivalent amount of a polyethylene polyamine and, in the case of the acid, heating the resultant mixture to effect acylation and remove the water formed thereby. The anhydride can react without external heating but may be heated to speed the reaction or if further reactions to the intermediate amic acid are desired. Suitable amines for this reaction include diethylene triamine, triethylene tetramine, tetraethylene pentamine, pentaethylene hexamine and aminoalkylated heterocyclic compounds. The reaction involves amidation of a dicarboxylic acid or anhydride thereof with a polymer to produce amino-substituted acyclic diamides, amic acids, polymeric amides, or a combination of these types of products. As noted above, the amide groups may further react to form imide groups in the process.

Equivalents here means that a minimum of one-half mole of alkenylsuccinic anhydride or acid per mole of amine is required. This would be the least amount of acid which could react with all of the amine added (via amic acid or acyclic polyamide formation). The maximum amount of acid or anhydride possible to react is one-half mole per primary or secondary amino group. Generally, one or two moles of acid or anhydride per mole of amine, regardless of the total number of nitrogen atoms, is preferred. The reaction product is effective in amounts ranging from about 0.10 to 5.0 weight percent. Methods for preparing the polyethylene polyamine reaction products are well-known and are described in U.S. 3,131,150 and 3,172,892.

An amine anti-oxidant is an important component of a lubricating oil composition and particularly of a fully formulated transmission fluid. Effective anti-oxidants are the arylsubstituted amine anti-oxidants exemplified by the phenyl naphthyl amines, see U.S. 3,414,618 as well as such compounds as phenylene diamine, phenothiazine and diphenylamine. A particularly preferred anti-oxidant is normally employed in a concentration ranging from about 0.1 to 2.5 weight percent.

A zinc dihydrocarbyl dithiophosphate or a compound of this general type is a valuable component of a mineral lubricating oil composition. A preferred compound of this class is represented by the formula:

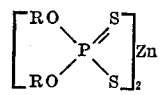

in which R represents an aliphatic hydrocarbon radical, having from 6 to 18 carbon atoms, an aryl, akaryl or a R'—(OR")$_n$-radical in which R' is an alkyl, aryl or alkaryl radical having from 1 to 12 carbon atoms, R" is an alkylene radical having from 2 to 4 carbon atoms and n is an integer from 1 to 10. Particularly effective compounds in this class are the zinc di(nonylphenoxyethyl) dithiophosphate, zinc di(dodecylphenoxyethyl) dithiophosphate and zinc di-n-octyl dithiophosphate. Zinc di(nonylphenoxyethyl) dithiophosphate is prepared by reacting a nonylphenoxyethanol with phosphorus pentasulfide followed by neutralization of the acid formed with a basic zinc compound, such as zinc carbonate, zinc oxide or zinc hydroxide. The general preparation of the compounds in this class is disclosed in U.S. 2,344,395 and 3,293,181. In use, it is convenient to prepare a mineral oil solution of the zinc di(C$_{6-15}$alkylphenoxypolyalkoxyalkyl) dithiophosphate or other zinc dialkylthiophosphates containing from 50 to 75 weight percent of the zinc salt. The salts are effective oxidation and corrosion inhibitors for automatic transmission fluids when employed in a concentration ranging from about 0.1 to 5.0 weight percent based on the hydraulic fluid.

Anti-foam agents are conventionally employed in hydraulic fluids because the fluids are rapidly circulated in operation and air can be entrapped. For this purpose, a silicone fluid of high viscosity, such as a dimethyl silicone polymer having a kinematic viscosity at 25° C. of about 1000 to 100,000 centistokes and above is preferably employed. A very satisfactory anti-foam agent for this purpose is prepared by diluting 10 grams of a dimethyl silicone polymer (1000–100,000 centistokes at 25° C.) with kerosene to provide a solution of 100 cubic centimeters. From 0.005 to 0.025 percent by weight of this concentrate is generally employed in the hydraulic fluid to provide from 5 to 20 parts per million of the silicone polymer based on the hydraulic fluid composition.

A preferred mineral base oil blend for preparing a lubricating oil composition for automatic transmission service will comprise 65 percent of a furfural-refined, acid-treated, clay-contacted, solvent-dewaxed, paraffin base distillate having an SUS at 100° F. of 100, a viscosity index about 100, a flash above 385° F. and a pour below +10° F., 22 percent of an acid-treated naphthenic base distillate having an SUS at 100° F. of 60, a flash above 300° F. and a pour below —40° F. and 13 percent of a paraffin base residuum which has been propane-deasphalted, solvent-dewaxed and clay-contacted and which had an SUS viscosity at 210° F. of 160, a flash of about 540° F. and a pour below 5° F. This base oil blend had a flash above 375° F., a pour below 0° F. and a viscosity index of about 93.

In its broadest aspects the lubricating oil composition of the invention will comprise a major proportion of a mineral lubricating oil base and 0.005 to 5.0 weight percent of the prescribed N-alkylmercaptosuccinimide.

A preferred fully formulated automatic transmission fluid will comprise a base oil blend as described above and will contain from about 0.5 to 8 weight percent of an oil concentrate containing about 35% of a basic amino nitrogen-containing addition type copolymer comprising copolymers of butyl, lauryl, stearyl and dimethyl aminoethyl methacrylates in approximately 21:53:22:4 weight ratios (as described in U.S. 2,737,496); about 0.25 to 5.0 weight percent of an oil concentrate containing about 33% of the reaction product of approximately 1:1 mole ratio of tetraethylene pentamine and alkenyl succinic anhydride in which the alkenyl radical is polybutene of approximately 1200 average molecular weight (U.S. 3,172,892); about 0.1 to 2.5 weight percent of phenyl alpha naphthylamine, about 0.1 to 2.5 weight percent of an oil concentrate containing about 50% of zinc dialkyl dithiophosphate and from about 0.005 to 5 weight percent of the N-alkylmercaptosuccinimide of the invention.

The friction stable property of the lubricating oil of the invention was determined in the Dexron Low Energy Cycling Test T–12. For this test, the friction modifier was added to a formulated base oil, designated Base Oil A, in a concentration of 0.2 weight percent to give a fully formulated automatic transmission fluid. Base Oil A, or the balance of the fully formulated transmission fluid less the friction modifier consisted of:

| Composition: | Wt. percent |
|---|---|
| Paraffin base distillate, SUS at 100° F. of 100 | 60.4 |
| Naphthenic base distillate, SUS at 100° F. of 60 | 20.0 |
| Paraffin base residuum, SUS at 210° F. of 160 | 10.0 |
| Copolymer of butyl, lauryl, stearyl and dimethylaminoethyl methacrylates | 4.0 |
| Alkenyl (1100 mol. wt.) succinic acid tetraethylenepentamine reaction product | 3.90 |
| Diethyl tert.-dioctyldiphenylamine | 0.60 |
| Zinc dialkylphenoxyethyldithiophosphate | 0.90 |

The Dexron Powerglide T–12 Test, with minor variations, is described in the General Motors Dexron Automatic Transmission Fluid Specification issued April 1967. This test is conducted using a Chevrolet engine with its corresponding Powerglide transmission mounted on a test stand in such a manner that the power output is absorbed by a Dynamatic 1519 eddy current dynamometer and an auxiliary inertia wheel increasing total system inertia to 6.7 square feet. The oil is maintained at a high bulk oil temperature of about 275° C. The fluid must have a test life of at least 225 hours to pass this qualifying test.

The fluid under test is used to fill the Powerglide transmission and it is tested by running the engine and transmission in a continuous series of 40 second cycles as follows:

(1) Accelerate to upshift at 7.8 sec.
(2) Upshift at 3200 engine r.p.m.
(3) Engine r.p.m. held at 2300 r.p.m. and output torque held at 230–235 lb. ft. for 22.1 (±0.1) seconds.
(4) Close throttle.
(5) Coast down to downshift at 4.2±0.5 seconds.
(6) Coast downshift.
(7) Continue coast to engine idle at 5.8 seconds after downshift.
(8) Repeat cycle.

The quality of shifting is determined as follows: at the time of upshift, the actual shifting is normally smoothly accomplished in about 0.4 second. After a period of essentially uniform shift time and smooth operation, the shifting becomes erratic or the shifting period begins to approach 0.8 to 0.9 second. The quality of shifting has then markedly deteriorated and the duration of smooth shifting has ended. The determination of shift smoothness is made both through its audible effect and by measurement at occasional intervals of torque changes with single cycles as clutch engagement proceeds.

The lubricating oil composition of the invention was tested in the Dexron Powerglide T–12 Test in comparison to a number of similar fluids. The results are shown in the table below:

TABLE I

| Run | Base oil A plus 0.2 wt. percent of additive | Hours to fail in Dexron T–12 Cycling Test |
|---|---|---|
| 1 | Base oil A [1] plus Sarkosyl S [2] | 243 |
| 2 | Base oil A [3] plus alpha-S-n-dodecyl-N-coco-mercaptosuccinimide. | 249 |
| 3 | Base oil A plus N-sec. C$_{15-20}$ alkylmercaptosuccinimide. | 516 |

[1] Base oil contained 1.25% zinc dithiophosphate.
[2] N-stearylsarcosine friction modifier.
[3] Base oil modified to contain only 3.00 wt. percent of alkenyl succinic acid tetraethylenepentamine reaction product and no zinc dithiophosphate and containing 0.28 percent alkylated aromatic amine, 0.60 percent zinc dialkyldithiophosphate and 0.80 percent zinc active alkenyl succinimide.

The foregoing tests show that the lubricant of the invention possessed outstanding life in the Dexron T-12 Cycling Test in comparison to a lubricant containing a commercial friction modifying additive and to a lubricant containing a N,S-dialkylmercaptosuccinimide.

We claim:

1. A lubricating oil composition comprising at least 86 weight percent of a mineral lubricating oil and a minor friction modifying amount of an N-alkylmercaptosuccinimide having the formula:

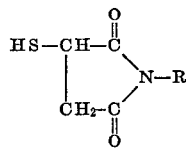

in which R is a straight chain alkyl radical having from 12 to 22 carbon atoms connected at the alpha or beta carbon position.

2. A lubricating oil composition characterized by having outstanding friction stable life in automatic transmission service comprising at least 86 weight percent of a mineral lubricating oil and from about 0.005 to 5.0 weight percent of an N-alkylmercaptosuccinimide corresponding to the following formula:

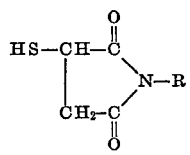

in which R is a straight chain alkyl radical having from 12 to 22 carbon atoms connected at the alpha or beta carbon position.

3. A lubricating oil composition according to claim 1 in which said alkyl radical contains from 14 to 20 carbon atoms.

4. A lubricating oil composition according to claim 1 in which said N-alkylmercaptosuccinimide is N-n-hexadecylmercaptosuccinimide.

5. A lubricating oil composition according to claim 1 in which said N-alkylmercaptosuccinimide is N-n-octadecylmercaptosuccinimide.

6. A lubricating oil composition according to claim 1 in which said N-alkylmercaptosuccinimide is N-n-dodecylmercaptosuccinimide.

7. A lubricating oil composition according to claim 1 in which said N-alkylmercaptosuccinimide is N-sec. $C_{15-20}$ alkylmercaptosuccinimide.

8. A lubricating oil composition according to claim 2 containing from about 0.25 to 5.0 weight percent of a dispersant.

9. A lubricating oil composition according to claim 2 containing a dispersant which is the reaction product of one to two moles of a succinic compound and a mole of a polyethylene polyamine, said succinic compound being represented by the formula:

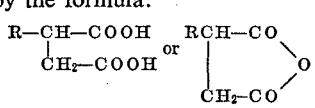

in which R is a substantially aliphatic hydrocarbon radical having from about 50 to 200 carbon atoms and said polyethylene polyamine is selected from the group consisting of diethylene triamine, triethylene tetramine, tetraethylene pentamine and pentaethylenehexamine.

10. A method for operating an automatic transmission which comprises supplying to said transmission a lubricating oil composition comprising at least 86 weight percent of a mineral lubricating oil, from about 0.1 to 5.0 weight percent of an ashless dispersant and from about 0.005 to 5.0 weight percent of an N-alkylmercaptosuccinimide represented by the formula:

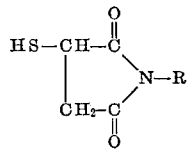

in which R is a straight chain alkyl radical having from 12 to 22 carbon atoms connected at the alpha or beta carbon position.

11. A method according to claim 10 in which said dispersant is the reaction product of one to two moles of a succinic compound and a mole of a polyethylene polyamine, said succinic compound being represented by the formula:

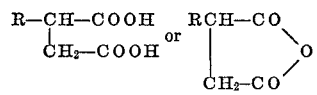

in which R is a substantially aliphatic hydrocarbon radical having from about 50 to 200 carbon atoms and said polyethylene polyamine is selected from the group consisting of diethylene triamine, triethylene tetramine, tetraethylene pentamine and pentaethylenehexamine.

12. A method according to claim 10 in which said N-alkylmercaptosuccinimide is N—(n-$C_{15}$–$C_{20}$ sec.alkyl) mercaptosuccinimide.

References Cited
UNITED STATES PATENTS

| | | | |
|---|---|---|---|
| 3,269,946 | 8/1966 | Wiese | 252—51.5 A |
| 3,272,746 | 9/1966 | Le Suer et al. | 252—47.5 |
| 3,541,012 | 11/1970 | Stuebe | 252—51.5 A |
| 3,234,131 | 2/1966 | Morway | 252—40.5 |
| 3,357,990 | 12/1967 | Vineyard | 252—47.5 X |
| 3,470,098 | 9/1969 | O'Halloran | 252—47.5 |
| 3,172,892 | 3/1965 | Le Suer et al. | 252—51.5 A |
| 3,219,666 | 11/1965 | Norman et al. | 252—51.5 A |
| 3,630,904 | 12/1971 | Musser et al. | 252—51.5 A |

DANIEL E. WYMAN, Primary Examiner

W. J. SHINE, Assistant Examiner

U.S. Cl. X.R.

252—51.5 A, 77, 78